US010000139B2

United States Patent
Lee et al.

(10) Patent No.: US 10,000,139 B2
(45) Date of Patent: Jun. 19, 2018

(54) SAFETY SYSTEM OF FUEL CELL VEHICLE AND CONTROL METHOD FOR THE SAME

(71) Applicant: Hyundai Motor Company, Seoul (KR)

(72) Inventors: Namwoo Lee, Gyeonggi-do (KR); Soonil Jeon, Gyeonggi-do (KR); Youngbum Kum, Seoul (KR); Juhan Kim, Gyeonggi-do (KR); Saehoon Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 688 days.

(21) Appl. No.: 14/555,867

(22) Filed: Nov. 28, 2014

(65) Prior Publication Data
US 2015/0343903 A1 Dec. 3, 2015

(30) Foreign Application Priority Data

Jun. 2, 2014 (KR) .................. 10-2014-0067188

(51) Int. Cl.
*B60L 11/18* (2006.01)
*B60L 3/00* (2006.01)
(Continued)

(52) U.S. Cl.
CPC ......... *B60L 11/1881* (2013.01); *B60L 3/0069* (2013.01); *B60L 3/04* (2013.01);
(Continued)

(58) Field of Classification Search
CPC .............. B60L 11/1881; B60L 11/1883; B60L 11/1887; B60L 3/0069; B60L 3/04;
(Continued)

(56) References Cited

U.S. PATENT DOCUMENTS

| | | | | |
|---|---|---|---|---|
| 6,764,782 B2 * | 7/2004 | Raiser | ............... | H01M 8/04634 429/430 |
| 7,311,116 B2 * | 12/2007 | Lillis | ................. | H01M 8/04753 137/256 |
| 7,862,944 B2 * | 1/2011 | Hinz | ................... | B60L 11/1881 429/430 |
| 8,264,234 B2 * | 9/2012 | Yano | ................... | B60L 11/1881 324/509 |

(Continued)

FOREIGN PATENT DOCUMENTS

| | | |
|---|---|---|
| JP | 2001-357863 A | 12/2001 |
| JP | 2003-009304 A | 1/2003 |

(Continued)

*Primary Examiner* — Dale W Hilgendorf
(74) *Attorney, Agent, or Firm* — Mintz Levin Cohn Ferris Glovsky and Popeo, P.C.; Peter F. Corless

(57) ABSTRACT

Disclosed are a safety system of a fuel cell vehicle and a control method for the safety system. A safety system of a fuel cell vehicle using a fuel cell and a high voltage battery as a power source may include: a power switch disposed on a power wire connecting the power source and a power load to each other; an insulation resistance measuring device measuring an insulation resistance between the power wire and a chassis; and a controller controlling an operation of the power switch based on a measured insulation resistance measured by the insulation resistance measuring device. When the measured insulation resistance is equal to or less than a reference resistance, the controller enters a safe mode and the power switch is turned off to thereby block power supplied to the power load.

16 Claims, 3 Drawing Sheets

(51) Int. Cl.
*B60L 3/04* (2006.01)
*H01M 16/00* (2006.01)
*H01M 8/04089* (2016.01)
*H01M 8/04537* (2016.01)
*H01M 8/04746* (2016.01)

(52) U.S. Cl.
CPC ....... *B60L 11/1883* (2013.01); *B60L 11/1887* (2013.01); *H01M 8/04089* (2013.01); *H01M 8/04634* (2013.01); *H01M 8/04753* (2013.01); *H01M 16/006* (2013.01); *B60L 3/0007* (2013.01); *B60L 2240/12* (2013.01); *H01M 2250/20* (2013.01); *Y02T 90/32* (2013.01); *Y02T 90/34* (2013.01)

(58) Field of Classification Search
CPC ........... H01M 8/04089; H01M 16/006; H01M 8/04634; H01M 8/04753
See application file for complete search history.

(56) References Cited

U.S. PATENT DOCUMENTS

| | | | | |
|---|---|---|---|---|
| 8,338,046 B2* | 12/2012 | Miyajima | ......... | H01M 8/04753 429/444 |
| 2007/0082240 A1* | 4/2007 | Fujita | ................ | H01M 8/04634 429/444 |
| 2010/0246081 A1* | 9/2010 | Yano | ................... | B60L 11/1887 361/91.5 |

FOREIGN PATENT DOCUMENTS

| | | | | | |
|---|---|---|---|---|---|
| JP | 2008-192543 | A | | 8/2008 | |
| JP | 2010-093934 | A | | 4/2010 | |
| JP | 2010093934 | A | * | 4/2010 | ............... B60L 3/04 |
| JP | 2010-239821 | A | | 10/2010 | |
| JP | 2011-217544 | A | | 10/2011 | |
| JP | 2013-206857 | A | | 10/2013 | |
| KR | 10-0792942 | B1 | | 1/2008 | |

* cited by examiner

SAFETY SYSTEM OF FUEL CELL VEHICLE AND CONTROL METHOD FOR THE SAME

CROSS-REFERENCE TO RELATED APPLICATION

This application claims priority to and the benefit of Korean Patent Application No. 10-2014-0067188 filed in the Korean Intellectual Property Office on Jun. 2, 2014, the entire contents of which are incorporated herein by reference.

TECHNICAL FIELD

The present invention relates to a safety system of a fuel cell vehicle and a control method for the safety system.

BACKGROUND

A fuel cell refers to a power generation device which directly converts chemical energy generated by oxidizing a fuel into electrical energy. The fuel cell may be similar to a chemical battery since that both basically use an oxidation and reduction reaction, but the fuel cell may be different from the chemical battery because in the fuel cell, reactants are continuously supplied from the exterior and reaction products are removed to the exterior of a system. However, in the chemical battery, battery reaction is performed in a closed system. Since the fuel cell generates the reaction products such as pure water, a research into a fuel cell vehicle as a green vehicle has been actively made.

A plurality of collision sensors may be provided to sense a collision of the fuel cell vehicle. For example, an air bag control unit (ACU) determines whether or not to expand an air bag based on signals input from the plurality of collision sensors.

When the collision of the fuel cell vehicle is determined only based on the signals input from the plurality of collision sensors, however, actually occurred collision may not be determined. For example, when a failure of the collision sensor itself, a failure of a wire connected to the collision sensor, a failure of an output value of the collision sensor or the like occurs, the actually occurred collision may not be determined. Some systems of the fuel cell vehicle may be damaged even when a collision which is not enough to expand the air bag occurs, and consequently, a secondary accident such as an electric shock accident may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a safety system of a fuel cell vehicle and a control method for the safety system having advantages. The system and the method may prevent an electric shock accident by determining whether or not the fuel cell vehicle is in a risk state based on a measured insulation resistance.

In an exemplary embodiment, a safety system of a fuel cell vehicle using a fuel cell and a high voltage battery as a power source may include: a power switch disposed on a power wire connecting the power source and a power load to each other; an insulation resistance measuring device measuring an insulation resistance between the power wire and a chassis; and a controller controlling an operation of the power switch based on a measured insulation resistance measured by the insulation resistance measuring device. Particularly, when the measured insulation resistance is equal to or less than a reference resistance, the controller may enter a safe mode and the power switch may be turned off to thereby block power supplied to the power load.

The safety system of the fuel cell vehicle may further include a first valve disposed on a hydrogen supply line connecting a hydrogen tank and the fuel cell and the first valve may be opened or closed according to a control of the controller. Particularly, when the measured insulation resistance is equal to or less than the reference resistance, the first valve may be completely closed and block hydrogen supplied to the fuel cell.

The safety system of the fuel cell vehicle may further include a second valve disposed on an air supply line connecting an air blower and the fuel cell and the second valve may be opened or closed according to a control of the controller. In particular, when the measured insulation resistance is equal to or less than the reference resistance, the second valve may be completely closed and block air supplied to the fuel cell.

The safety system of the fuel cell vehicle may further include a collision detector detecting a collision of the fuel cell vehicle and transferring a collision signal to the controller, and particularly when the collision is detected, the controller may enter the safe mode.

In an exemplary embodiment, a safety system of a fuel cell vehicle using a fuel cell and a high voltage battery as a power source may include: a power switch disposed on a power wire connecting the power source and a power load to each other; an insulation resistance measuring device measuring an insulation resistance between the power wire and a chassis; a vehicle speed detector detecting a speed of the fuel cell vehicle; and a controller controlling an operation of the power switch based on a measured insulation resistance measured by the insulation resistance measuring device and the speed of the fuel cell vehicle. In particular, when the measured insulation resistance is equal to or less than a reference resistance and the speed of the fuel cell vehicle is equal to or less than a reference speed, the controller may enter a safe mode and the power switch may be turned off to thereby block power supplied to the power load.

The safety system of the fuel cell vehicle may further include a first valve disposed on a hydrogen supply line connecting a hydrogen tank and the fuel cell, and the first valve may be opened or closed according to a control of the controller. Particularly, when the measured insulation resistance is equal to or less than the reference resistance and the speed of the fuel cell vehicle is equal to or less than the reference speed, the first valve may be completely closed and block hydrogen supplied to the fuel cell.

The safety system of the fuel cell vehicle may further include a second valve disposed on an air supply line connecting an air blower and the fuel cell, and the second valve may be opened or closed according to a control of the controller. In particular, when the measured insulation resistance is equal to or less than the reference resistance and the speed of the fuel cell vehicle is equal to or less than the reference speed, the second valve may be completely closed and block air supplied to the fuel cell.

The safety system of the fuel cell vehicle may further include a collision detector detecting a collision of the fuel cell vehicle and transferring a collision signal to the controller, and particularly when the collision is detected, the controller may enter the safe mode.

The present invention also provides a control method of a safety system of a fuel cell vehicle using a fuel cell and a high voltage battery as a power source. The control method may include steps of: receiving a measured insulation resistance from an insulation resistance measuring device; comparing the measured insulation resistance with a reference resistance; determining whether or not to enter a safe mode according to the comparison result; and blocking power supplied from the power source to a power load in the safe mode.

The control method may further include entering the safe mode when the measured insulation resistance is equal to or less than the reference resistance.

The control method may further include blocking hydrogen supplied from a hydrogen tank to the fuel cell in the safe mode.

The control method may further include blocking air supplied from an air blower to the fuel cell in the safe mode.

The control method may further include entering the safe mode when a collision is detected based on a collision signal input from a collision detector.

The control method may further include comparing a speed of the fuel cell vehicle with a reference speed. The step of determining of whether or not to enter the safe mode may include entering the safe mode when the measured insulation resistance is equal to or less than the reference resistance and the speed of the fuel cell vehicle is equal to or less than the reference speed.

According to various exemplary embodiment of the present invention, the supplement of power and hydrogen may be blocked by determining whether or not the fuel cell vehicle is in the risk state based on the measured insulation resistance.

Further provided are vehicles including automotive vehicles that comprise a safety system and/or a fuel cell system as disclosed herein.

Figure 1:
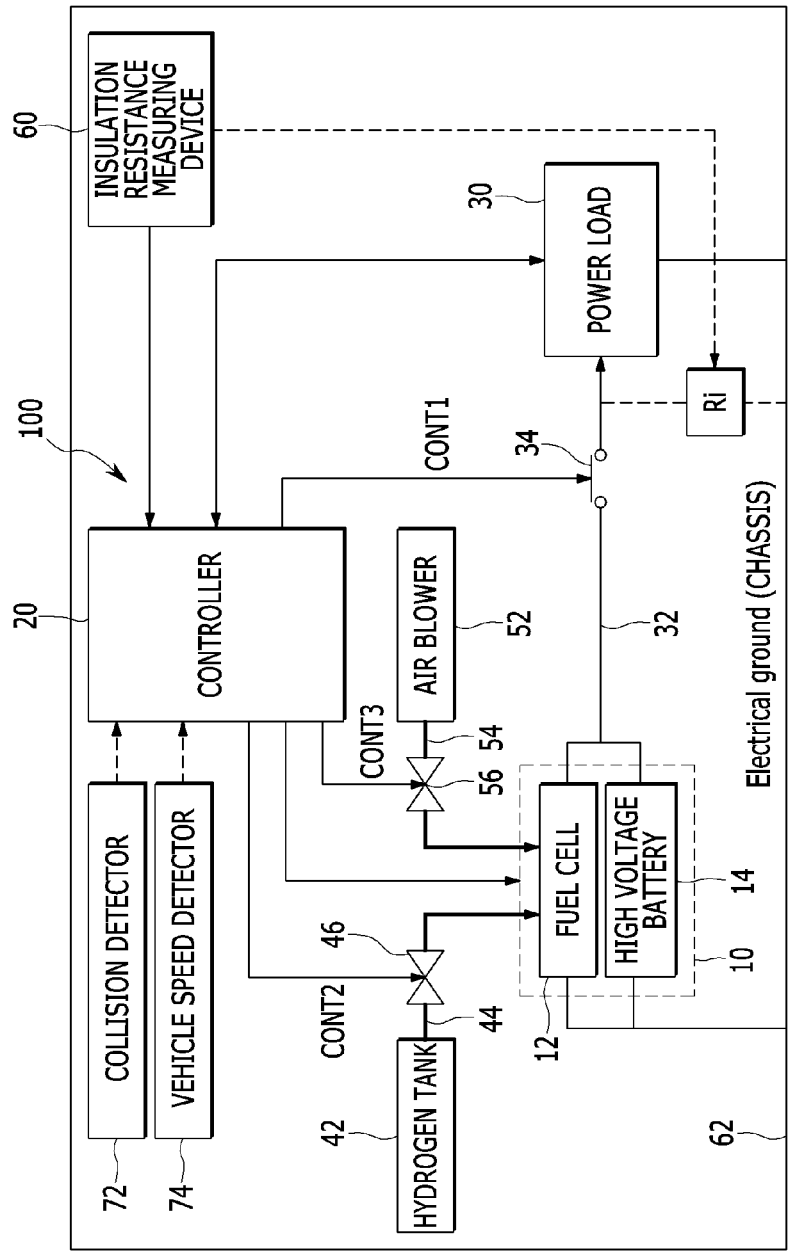
FIG. 1 illustrates an exemplary fuel cell vehicle according to an exemplary embodiment of the present invention.

Reference numerals set forth in the FIGS. 1-3 include reference to the following elements as further discussed below:

10: power source
12: fuel cell
14: high voltage battery
20: controller
30: power load
42: hydrogen tank
44: hydrogen supply line
46: first valve
52: air blower
54: air supply line
56: second valve
60: insulation resistance measuring device
62: chassis
72: collision detector
74: vehicle speed detector
100: safety system

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following detailed description, the present invention will be described more fully hereinafter with reference to the accompanying drawings, in which exemplary embodiments of the invention are shown However, the present invention is not limited to the exemplary embodiments which are described herein, and may be modified in various different ways.

Accordingly, the drawings and description are to be regarded as illustrative in nature and not restrictive. Like reference numerals designate like elements throughout the specification In addition, since the respective components shown in the drawings are arbitrarily shown for the convenience of explanation, the present invention is not necessarily limited to those shown in the drawings.

FIG. 1 illustrates an exemplary fuel cell vehicle according to an exemplary embodiment of the present invention.

As shown in FIG. 1, the fuel cell vehicle according to an exemplary embodiment of the present invention uses a power source 10 including a fuel cell 12 and a high voltage battery 14. A safety system 100 of the fuel cell vehicle according to the exemplary embodiment of the present invention may block power supplied to a power load 30 according to a control of a controller 20 and hydrogen supplied to the fuel cell 12 from a hydrogen tank 42 based on a measured insulation resistance.

The power load 30 may include a driving motor driving the fuel cell vehicle and a variety of electronic devices using power.

The fuel cell 12 generates power by an electrical and chemical reaction of hydrogen as a fuel and air as an oxidizing agent. The generated power may be supplied to the power load 30.

The hydrogen stored in the hydrogen tank 42 may be supplied to the fuel cell 12 through a hydrogen supply line 44. A first valve 46 is disposed on the hydrogen supply line 44 connecting the hydrogen tank 42 and the fuel cell 12 to each other. The first valve 46 may be opened or closed according to the control of the controller 20, and when the first valve 46 is completely closed, the supplement of the hydrogen may be blocked.

An air blower 52 may supply external air containing oxygen to the fuel cell 12 through an air supply line 54. A second valve 56 is disposed on the air supply line 54. The second valve 56 may be opened or closed according to the control of the controller 20, and when the second valve 56 is completely closed, the supplement of the air may be blocked.

A power switch 34 is disposed on a power wire 32 connecting the power source 10 and the power load 30 to each other. During a state in which the power switch 34 is turned on, the power generated by the power source 10 may be supplied to the power load 30.

An insulation resistance measuring device 60 may measure an insulation resistance between the power wire 32 and a chassis 62. A measured insulation resistance measured by the insulation resistance measuring device 60 may be transferred to the controller 20. The chassis 62 may serve as an electrical ground of the fuel cell vehicle.

A collision detector 72 may detect a collision of the fuel cell vehicle and transfers a collision signal to the controller 20. The collision detector 72 may be any one of a plurality of collision sensors mounted on set positions in the fuel cell vehicle and changing an output value when a collision occurs, such as an air bag control unit (ACU) which determines whether or not to expand an air bag according to a collision amount.

A vehicle speed detector 74 may detect a speed of the fuel cell vehicle and may be mounted on a wheel of the fuel cell vehicle.

The controller 20 may be implemented by one or more microprocessors executed by a predetermined program. The predetermined program may include a series of instructions for performing each step provided in a control method of a safety system of a fuel cell vehicle according to an exemplary embodiment of the present invention to be described below.

The controller 20 may control operations of the power switch 34, the first valve 46, and the second valve 56 based on the measured insulation resistance.

Hereinafter, a control method of a safety system of a fuel cell vehicle according to an exemplary embodiment of the present invention will be described in more detail with reference to FIGS. 2 and 3.

Figure 2:
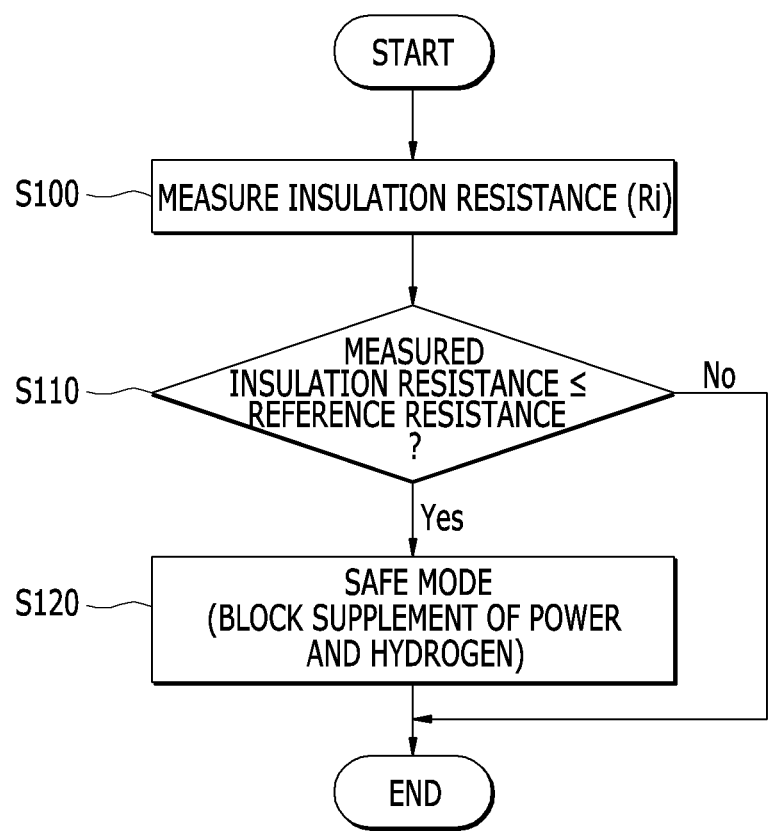
FIG. 2 illustrates an exemplary control method of an exemplary safety system of a fuel cell vehicle according to an exemplary embodiment of the present invention.

FIG. 2 shows an exemplary control method of a safety system of a fuel cell vehicle according to an exemplary embodiment of the present invention.

As shown in FIG. 2, an exemplary control method of an exemplary safety system of a fuel cell vehicle according to an exemplary embodiment of the present invention may be initiated by measuring the insulation resistance $R_t$ by the insulation resistance measuring device 60 (S100). The controller 20 may receive the measured insulation resistance measured by the insulation resistance measuring device 60.

The controller 20 may compare the measured insulation resistance with a reference resistance (S110). The reference resistance may be determined to a value, for example, $100(\Omega/Vdc)$, which may be determined by a person of an ordinary skill in the art. For example, an insulation resistance may be managed to be greater than about $100(\Omega/Vdc)$ for safety property of the fuel cell vehicle.

In S110, when the measured insulation resistance is greater than the reference resistance, the controller 20 may end the control method of the safety system of the fuel cell vehicle.

In S110, when the measured insulation resistance is equal to or less than the reference resistance, the controller 20 may determine that the fuel cell vehicle is in a risk state such as a collision or flooding state.

When the measured insulation resistance is equal to or less than the reference resistance, the controller 20 may enter a safe mode (S120). When entering the safe mode, the controller 20 may block power supplied to the power load 30 and hydrogen supplied to the fuel cell 12. In particular, the power switch 34 may be turned off according to a control signal (CONT1) of the controller 20, such that the power supplied from the power source 10 to the power load 30 may be blocked. The first valve 46 may be completely closed according to a control signal (CONT2) of the controller 20 to thereby block the hydrogen supplied to the fuel cell 12. In addition, the second valve 56 may be completely closed according to a control signal (CONT3) of the controller 20 to thereby block the air supplied to the fuel cell 12.

In addition, the controller 20 may determine whether or not it enters the safe mode based on a collision signal input from the collision detector 72. In other words, although the measured insulation resistance is substantially less than the reference resistance as well as the collision detector 72 detects the collision, the supplement of power and hydrogen may be blocked. Unlike using only the collision signal of the collision detector 72, although a failure of the collision detector 72 itself, a failure of a wire connected to the collision detector 72, a failure of an output value of the collision detector 72, or the like occurs, it may be determined whether or not the fuel cell vehicle is in the risk state based on the measured insulation resistance, thereby preventing an electric shock accident.

Figure 3:
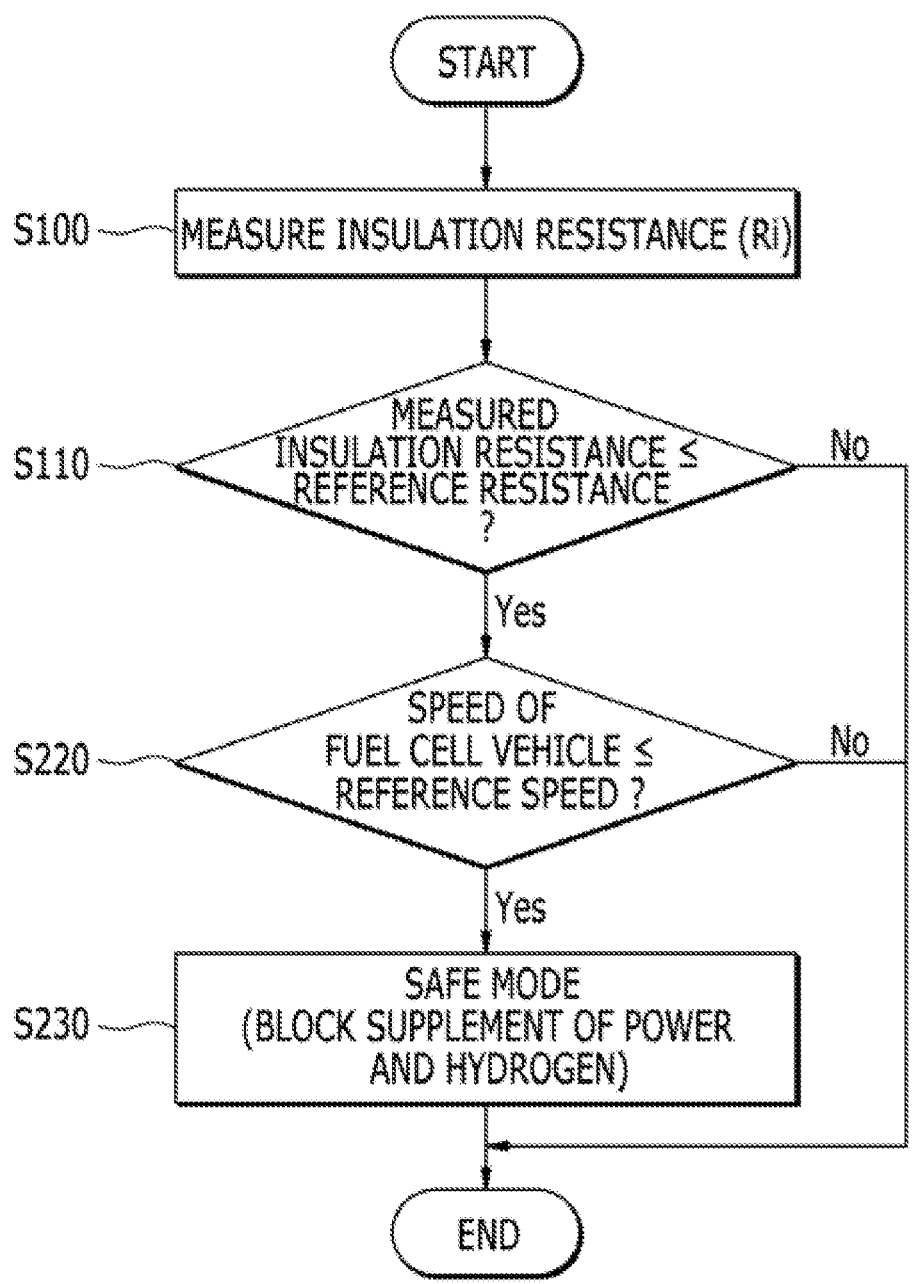
FIG. 3 is a flowchart of a control method of a safety system of a fuel cell vehicle according to another exemplary embodiment of the present invention.

FIG. 3 shows an exemplary control method of a safety system of a fuel cell vehicle according to an exemplary embodiment of the present invention.

As shown in FIG. 3, the control method of the safety system of the fuel cell vehicle according to an exemplary embodiment of the present invention may be described above for FIG. 2, but the control method in FIG. 3 may further include a step (S220) in which a speed of the fuel cell vehicle is compared to a reference speed.

The controller 20 may compare the speed of the fuel cell vehicle with the reference speed in order to accurately determine whether or not a collision of the fuel cell vehicle occurs. The reference speed may be determined to a value, for example, 0[km/h], which may be determined by a person of an ordinary skill in the art.

The controller 20 may incorrectly determine that the collision occurs according to a incorrectly measured insulation resistance when which a failure of the insulation resistance measuring device 60 itself, a failure of a wire connected to the insulation resistance measuring device 60, a failure of an output value of the insulation resistance measuring device 60 or the like occurs. Accordingly, the controller 20 may determine whether the fuel cell vehicle has stopped in a state in which the measured insulation resistance is equal to or less than the reference resistance.

In S220, when the speed of the fuel cell vehicle is greater than the reference speed, the controller 20 may end the control method of the safety system of the fuel cell vehicle.

In S220, when the speed of the fuel cell vehicle is equal to or less than the reference speed, the controller 20 may enter the safe mode (S230). Consequently, it may be accurately determined whether or not the fuel cell vehicle is in the risk state.

According to various exemplary embodiments of the present invention, the supplement of power and hydrogen may be blocked by determining whether or not the fuel cell vehicle is in the risk state based on the measured insulation resistance.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A safety system of a fuel cell vehicle using a fuel cell and a high voltage battery as a power source, comprising:
   a power switch disposed on a power wire connecting the power source and a power load to each other;
   an insulation resistance measuring device configured to measure an insulation resistance between the power wire and a chassis;
   a controller configured to operate the power switch based on the measured insulation resistance,
   wherein when the measured insulation resistance is equal to or less than a reference resistance, the controller enters a safe mode and the power switch is turned off to block power supplied to the power load; and
   a first valve disposed on a hydrogen supply line connecting a hydrogen tank and the fuel cell,
   wherein the controller is configured to open or close the first valve, and
   wherein when the measured insulation resistance is equal to or less than the reference resistance, the first valve is completely closed and blocks hydrogen supplied to the fuel cell.

2. The safety system of the fuel cell vehicle of claim 1, further comprising:
   a second valve disposed on an air supply line connecting an air blower and the fuel cell,
   wherein the controller is configured to open or close the second valve, and
   wherein when the measured insulation resistance is equal to or less than the reference resistance, the second valve is completely closed and blocks air supplied to the fuel cell.

3. The safety system of the fuel cell vehicle of claim 1, further comprising:
   a collision detector configured to detect a collision of the fuel cell vehicle and transfer a collision signal to the controller,
   wherein when the collision is detected, the controller enters the safe mode.

4. A safety system of a fuel cell vehicle using a fuel cell and a high voltage battery as a power source, comprising:
   a power switch disposed on a power wire connecting the power source and a power load to each other;
   an insulation resistance measuring device configured to measure an insulation resistance between the power wire and a chassis;
   a vehicle speed detector configured to detect a speed of the fuel cell vehicle;
   a controller configured to operate the power switch based on the measured insulation resistance and the speed of the fuel cell vehicle,
   wherein when the measured insulation resistance is equal to or less than a reference resistance and the speed of the fuel cell vehicle is equal to or less than a reference speed, the controller enters a safe mode and the power switch is turned off to thereby block power supplied to the power load; and
   a first valve disposed on a hydrogen supply line connecting a hydrogen tank and the fuel cell,
   wherein the controller is configured to open or close the first valve, and
   wherein when the measured insulation resistance is equal to or less than the reference resistance and the speed of the fuel cell vehicle is equal to or less than the reference speed, the first valve is completely closed and blocks hydrogen supplied to the fuel cell.

5. The safety system of the fuel cell vehicle of claim 4, further comprising:
   a second valve disposed on an air supply line connecting an air blower and the fuel cell,
   wherein the controller is configured to open or close the second valve, and
   wherein when the measured insulation resistance is equal to or less than the reference resistance and the speed of the fuel cell vehicle is equal to or less than the reference speed, the second valve is completely closed and blocks air supplied to the fuel cell.

6. The safety system of the fuel cell vehicle of claim 4, further comprising:
   a collision detector configured to detect a collision of the fuel cell vehicle and transferring a collision signal to the controller,
   wherein when the collision is detected, the controller enters the safe mode.

7. A control method of safety system of a fuel cell vehicle using a fuel cell and a high voltage battery as a power source, comprising:
   receiving, by a controller, a measured insulation resistance from an insulation resistance measuring device;
   comparing, by the controller, the measured insulation resistance with a reference resistance;

determining, by the controller, whether to enter a safe mode according to the comparison result;

blocking, by the controller, power supplied from the power source to a power load in the safe mode; and blocking, by the controller, hydrogen supplied from a hydrogen tank to the fuel cell in the safe mode.

8. The control method of claim 7, further comprising entering, by the controller, the safe mode when the measured insulation resistance is equal to or less than the reference resistance.

9. The control method of claim 7, further comprising blocking, by the controller, air supplied from an air blower to the fuel cell in the safe mode.

10. The control method of claim 7, further comprising entering, by the controller, the safe mode when a collision is detected based on a collision signal input from a collision detector.

11. The control method of claim 7, further comprising:

comparing, by the controller, a speed of the fuel cell vehicle with a reference speed, wherein the determination of whether to enter the safe mode includes entering, by the controller, the safe mode when the measured insulation resistance is equal to or less than the reference resistance and the speed of the fuel cell vehicle is equal to or less than the reference speed.

12. A non-transitory computer readable medium containing program instructions executed by a controller, the computer readable medium comprising:

program instructions that receive a measured insulation resistance from an insulation resistance measuring device;

program instructions that compare the measured insulation resistance with a reference resistance;

program instructions that determine whether to enter a safe mode according to the comparison result;

program instructions that block power supplied from the power source to a power load in the safe mode; and program instructions that block hydrogen supplied from a hydrogen tank to the fuel cell in the safe mode.

13. The non-transitory computer readable medium of claim 12, further comprising program instructions that enter the safe mode when the measured insulation resistance is equal to or less than the reference resistance.

14. The non-transitory computer readable medium of claim 12, further comprising program instructions that block air supplied from an air blower to the fuel cell in the safe mode.

15. The non-transitory computer readable medium of claim 12, further comprising program instructions that enter the safe mode when a collision is detected based on a collision signal input from a collision detector.

16. A vehicle, comprising:

a safety system of a fuel cell vehicle using a fuel cell and a high voltage battery as a power source, comprising:

a power switch disposed on a power wire connecting the power source and a power load to each other;

an insulation resistance measuring device configured to measure an insulation resistance between the power wire and a chassis;

a controller configured to operate the power switch based on a measured insulation resistance, wherein when the measured insulation resistance is equal to or less than a reference resistance, the controller enters a safe mode and the power switch is turned off to block power supplied to the power load; and a first valve disposed on a hydrogen supply line connecting a hydrogen tank and the fuel cell, wherein the controller is configured to open or close the first valve, and wherein when the measured insulation resistance is equal to or less than the reference resistance, the first valve is completely closed and blocks hydrogen supplied to the fuel cell.

* * * * *